(12) United States Patent
Hsieh et al.

(10) Patent No.: US 7,403,700 B2
(45) Date of Patent: Jul. 22, 2008

(54) MOTOR CONTROL DEVICE

(75) Inventors: Tsung-Jung Hsieh, Taoyuan Hsien (TW); Yueh-Lung Huang, Taoyuan Hsien (TW); Chun-Lung Chiu, Taoyuan Hsien (TW); Ming-Shi Tsai, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 182 days.

(21) Appl. No.: 11/488,694

(22) Filed: Jul. 19, 2006

(65) Prior Publication Data

US 2007/0019935 A1  Jan. 25, 2007

(30) Foreign Application Priority Data

Jul. 22, 2005  (TW) ............................... 94124955 A

(51) Int. Cl.
*H02P 7/29* (2006.01)

(52) U.S. Cl. .................. 388/811; 318/799; 318/801; 318/807; 318/810

(58) Field of Classification Search .......... 388/811; 318/799, 801, 807, 810
See application file for complete search history.

(56) References Cited

U.S. PATENT DOCUMENTS

| 5,285,141 | A  | * | 2/1994 | Hwang ........................ 318/608 |
| 5,708,578 | A  | * | 1/1998 | Stoddard et al. .............. 363/98 |
| 7,224,133 | B2 | * | 5/2007 | Nakatsugawa et al. . 318/400.01 |
| 2003/0095013 | A1 | * | 5/2003 | Melanson et al. ........... 332/109 |
| 2004/0000889 | A1 | * | 1/2004 | Collier-Hallman .......... 318/437 |

* cited by examiner

*Primary Examiner*—Rita Leykin
(74) *Attorney, Agent, or Firm*—Birch, Stewart, Kolasch & Birch, LLP

(57) ABSTRACT

A motor control device is used to control a motor to rotate. The motor control device includes a phase-wave signal sampling module, a first waveform modulating module, a second waveform modulating module and a control signal integrating module. The phase-wave signal sampling module outputs a first phase-wave signal and a second phase-wave signal in accordance with the rotation of the motor. The first waveform modulating module generates a first control signal in accordance with the first phase-wave signal. The second waveform modulating module generates a second control signal in accordance with the second phase-wave signal. The control signal integrating module generates a rotation rate control signal in accordance with the first control signal and the second control signal, and inputs the rotation rate control signal to a drive module to control a rotation rate of the motor.

22 Claims, 11 Drawing Sheets

MOTOR CONTROL DEVICE

BACKGROUND OF THE INVENTION

1. Field of Invention

The present invention relates to a control device, and more particularly to a motor control device.

2. Related Art

The control technology for motors has been well developed. The methods of controlling a motor using a circuit to change the rotation rate of the motor or to control the rotating direction of the motor have universally existed in various fields of motor control.

As shown in FIG. 1, a conventional motor control device 1 for controlling such as a fan motor 14 includes a pulse width modulation (PWM) generating circuit 11, a DC voltage generating circuit 12 and a drive chip 13. The PWM generating circuit 11 generates a pulse width modulation signal $PWM_1$ and inputs the pulse width modulation signal $PWM_1$ to the DC voltage generating circuit 12. The DC voltage generating circuit 12 converts the pulse width modulation signal $PWM_1$ into a DC voltage signal $Vdc_1$. The DC voltage signal $Vdc_1$ is compared with a high-frequency triangular wave signal Stri built in the drive chip 13, and a drive signal $Dri_1$ is then generated to drive the fan motor 14 to rotate. Further referring to FIG. 2, when the duty cycle of the pulse width modulation signal $PWM_1$ varies, the converted DC voltage signal $Vdc_1$ varies. Different drive signals for controlling the rotation rate of the fan motor 14 are modulated after the DC voltage signal $Vdc_1$ is compared with the high-frequency triangular wave signal Stri of the drive chip 13.

As shown in FIG. 2, the duty cycle of the drive signal $Dri_1$ is constant (does not vary with time). A current waveform $I_1$ detected from the power terminal of the motor control device 1 is shown in FIG. 3 when the fan motor 14 is controlled under a low rotation rate. A current waveform $I_2$ detected from the power terminal of the motor control device 1 is shown in FIG. 4 when the fan motor 14 is controlled under a high rotation rate.

As shown in FIG. 3, the current waveform $I_1$ generates an inrush current during the phase of the rotation-rate waveform FG outputted from the fan motor 14 is changed. The inrush current can enable the fan motor 14 to change the polarity and rotate. However, a larger rotating torque is generated corresponding to the inrush current, and the noises occur during the polarity of the fan motor 14 is changed under a low rotation rate.

As shown in FIG. 4, the duty cycle of the current waveform $I_2$ does not vary during the phase of the rotation-rate waveform FG outputted from the fan motor 14 is changed. The current increases as the rotation rate increases, and the noises occur during the polarity of the fan motor 14 is changed under a high rotation rate.

The above-mentioned drawbacks about the noises will not only restrict the application of the motor but weaken the purchase desire. Therefore, it is imperative to provide a motor control device to reduce the noise caused by the rotation of the motor.

SUMMARY OF THE INVENTION

In view of the foregoing, the present invention provides a motor control device capable of reducing the noise caused by the rotation of the motor.

To achieve the above, a motor control device according to the present invention is used to control a motor to rotate. The motor control device includes a phase-wave signal sampling module, a first waveform modulating module, a second waveform modulating module and a control signal integrating module. The phase-wave signal sampling module outputs a first phase-wave signal and a second phase-wave signal in accordance with the rotation of the motor. The first waveform modulating module generates a first control signal in accordance with the first phase-wave signal. The second waveform modulating module generates a second control signal in accordance with the second phase-wave signal. The control signal integrating module generates a rotation rate control signal in accordance with the first control signal and the second control signal, and inputs the rotation rate control signal to a drive module to control a rotation rate of the motor.

The motor control device of the present invention generates the rotation rate control signal, which is different from a conventional DC voltage, using the first waveform modulating module, the second waveform modulating module and the control signal integrating module in accordance with the first phase-wave signal and the second phase-wave signal. Thus, a suitable rotation rate control signal can be provided to the drive module, and the noise caused by the rotation of the motor can be reduced.

To achieve the above, another motor control device according to the present invention includes a phase-wave signal sampling module, a waveform modulating module and a drive module. The phase-wave signal sampling module outputs a first phase-wave signal and a second phase-wave signal in accordance with the rotation of a motor. The waveform modulating module generates a rotation rate control signal in accordance with the first phase-wave signal and the second phase-wave signal. The duty cycle of the rotation rate control signal is lowered when the phases of the first phase-wave signal and the second phase-wave signal are changed.

As mentioned above, a motor control device according to the present invention utilizes the waveform modulating module to generate the rotation rate control signal, the duty cycle of which is lowered when the phases of the first phase-wave signal and the second phase-wave signal are changed, in accordance with the first phase-wave signal and the second phase-wave signal. Thus, a suitable rotation rate control signal may be provided to the drive module, and the noise caused by the rotation of the motor can be reduced.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 5:
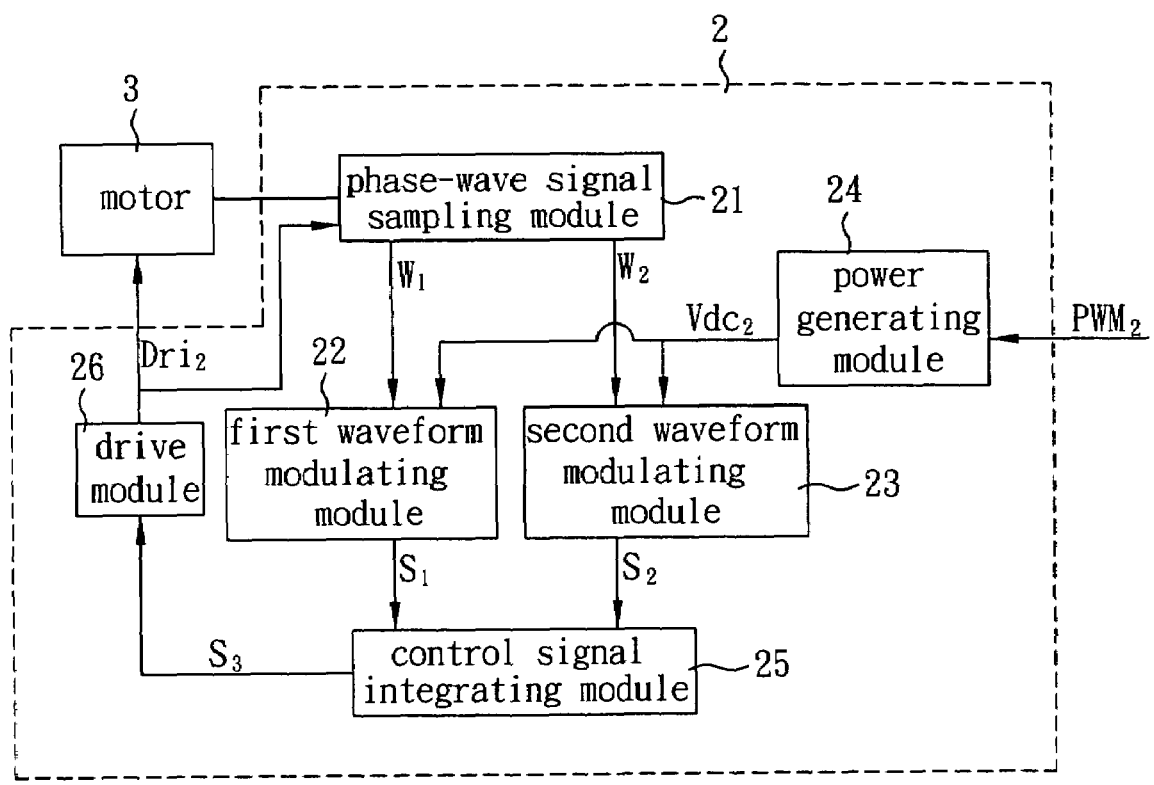
FIG. 5 is a block diagram showing a motor control device according to a preferred embodiment of the present invention.

As shown in FIG. 5, a motor control device 2 according to a preferred embodiment of the present invention is used to control a motor 3 to rotate. In this embodiment, the motor 3 may be a fan motor.

The motor control device 2 includes a phase-wave signal sampling module 21, a first waveform modulating module 22, a second waveform modulating module 23, a power generating module 24, a control signal integrating module 25 and a drive module 26.

Figure 8:
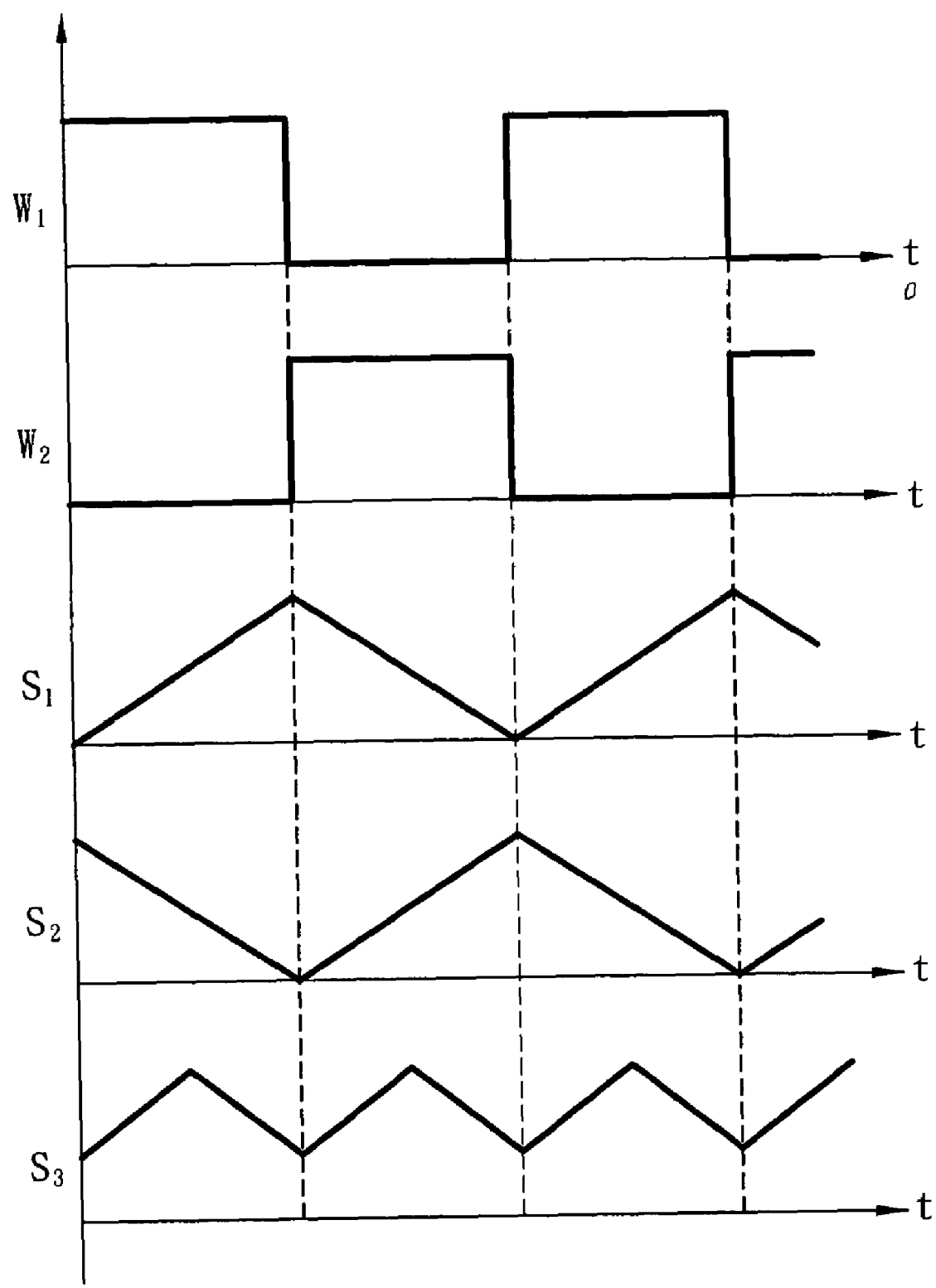
FIG. 8 is a timing chart showing timings in motor control device according to the preferred embodiment of the present invention.

The phase-wave signal sampling module 21 outputs a first phase-wave signal $W_1$ and a second phase-wave signal $W_2$ as the motor 3 rotates by one revolution. In this embodiment, the first phase-wave signal $W_1$ and the second phase-wave signal $W_2$ are square wave signals having the same amplitude but opposite phases, as shown in FIG. 8.

Figure 6:
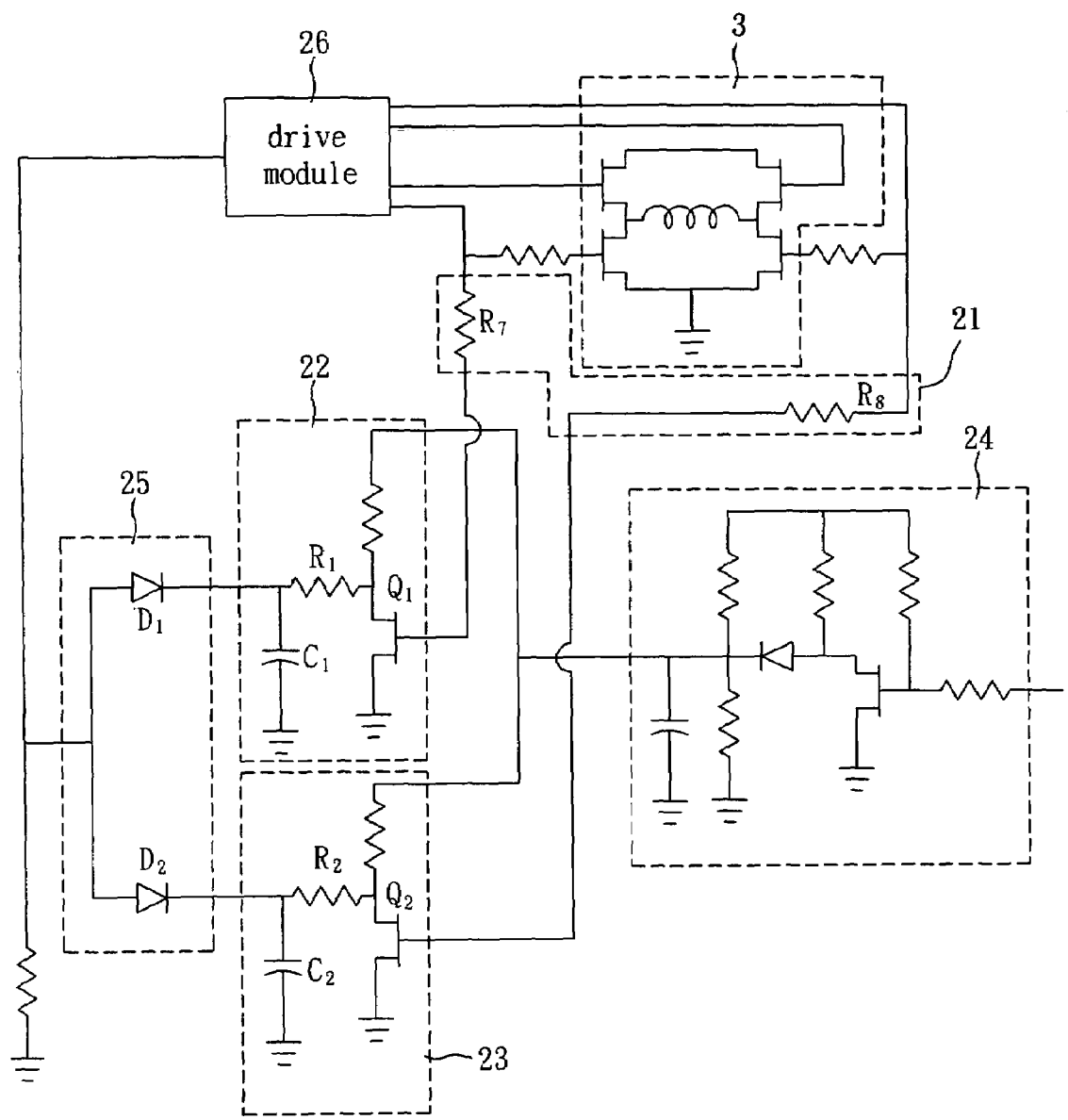
FIG. 6 is a circuit diagram showing a motor control device according to the preferred embodiment of the present invention.

As shown in FIG. 6, the phase-wave signal sampling module 21 includes two resistors $R_7$ and $R_8$. In addition, a Hall element is disposed within the drive module 26 for detecting the square wave signal generated during the motor 3 rotates. The first phase-wave signal $W_1$ and the second phase-wave signal $W_2$ are outputted through the resistors $R_7$ and $R_8$, respectively.

The first waveform modulating module 22 generates a first control signal $S_1$ in accordance with the first phase-wave signal $W_1$. In addition, the first waveform modulating module 22 can be an integrated circuit such that the square wave input is modulated into a triangular wave output or a triangle-like wave output.

As shown in FIG. 6, the first waveform modulating module 22 of this embodiment includes a switch element $Q_1$, a capacitor $C_1$ and a resistor $R_1$. The switch element $Q_1$ can be a field effect transistor (FET) or other switch elements. The field effect transistor can be a junction-gate element or an insulated gate element. The junction-gate element can be a junction-gate field effect transistor (JFET) or a metal semiconductor field effect transistor (MESFET). The insulated gate element can be an E-MOSFET or a D-MOSFET.

Figure 7:
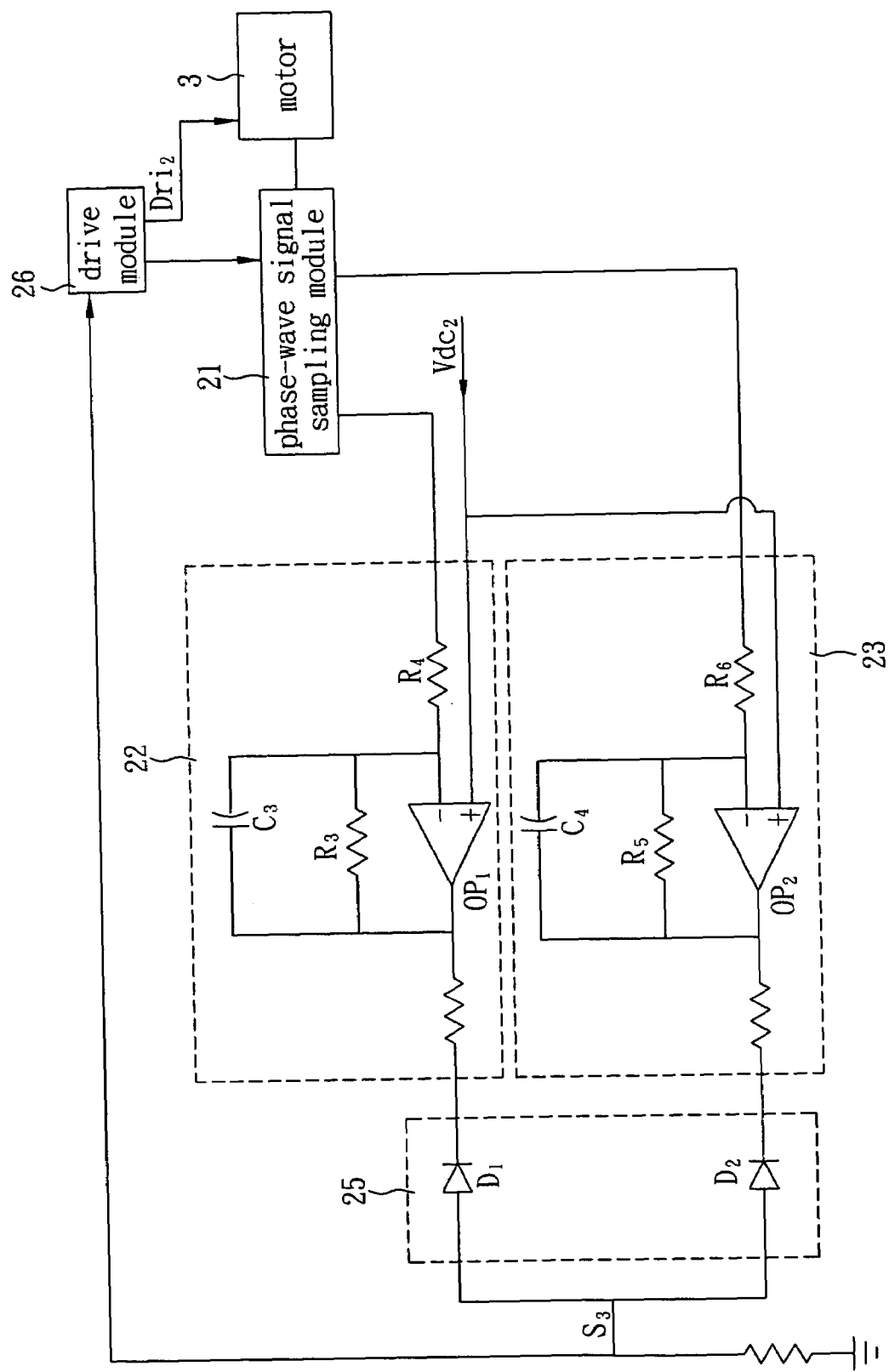
FIG. 7 is another circuit diagram showing a motor control device according to the preferred embodiment of the present invention.

Alternatively, the first waveform modulating module 22 includes an OP amplifier, a capacitor and at least one resistor. As shown in FIG. 7, the first waveform modulating module 22 of this embodiment includes a waveform modulating circuit, including an OP amplifier $OP_1$, a capacitor $C_3$ and two resistors $R_3$ and $R_4$, to achieve the effect of the integrated circuit. Thus, the square wave input can be modulated into the triangular wave output in accordance with the conventional modulating principle, which is well known in the art and is omitted in the description.

Referring again to FIG. 5, the second waveform modulating module 23 generates a second control signal $S_2$ in accordance with the second phase-wave signal $W_2$. Referring again to FIG. 6, the second waveform modulating module 23 of this embodiment includes a switch element $Q_2$, a resistor $R_2$ and a capacitor $C_2$, which have the same properties and functions as those of the switch element $Q_1$, the resistor $R_1$ and the capacitor $C_1$. In addition, the second waveform modulating module 23 can also include an OP amplifier, a capacitor and at least one resistor. Referring again to FIG. 7, the second waveform modulating module 23 of this embodiment includes an OP amplifier $OP_2$, a capacitor $C_4$ and two resistors $R_5$ and $R_6$, which have the same properties and functions as those of the OP amplifier $OP_1$, the capacitor $C_3$ and the resistors $R_3$ and $R_4$. That is, the second waveform modulating module 23 and the first waveform modulating module 22 have the same property and the same function, and detailed descriptions of the module 23 are omitted.

The power generating module 24 receives a pulse width modulation signal $PWM_2$, generates a DC power signal $Vdc_2$, and inputs the DC power signal $Vdc_2$ to the first waveform modulating module 22 and the second waveform modulating module 23. In this embodiment, when the duty cycle of the pulse width modulation signal $PWM_2$ is increased, the DC power signal $Vdc_2$ generated by the power generating module 24 is decreased. In addition, the DC power signal $Vdc_2$ is a voltage value for defining a maximum of the first control signal $S_1$ and the second control signal $S_2$.

The control signal integrating module 25 generates a rotation rate control signal $S_3$ in accordance with the first control signal $S_1$ and the second control signal $S_2$, and inputs the rotation rate control signal $S_3$ to the drive module 26, which generates a drive signal $Dri_2$ to control a rotation rate of the motor 3. Referring to FIG. 6, the control signal integrating module 25 of this embodiment can include at least two diodes $D_1$ and $D_2$ for integrating the first control signal $S_1$ with the second control signal $S_2$. The drive module 26 can be a digital signal processor (DSP) or a microprocessor control unit (MCU).

Furthermore, the drive module 26 can receive the rotation rate control signal $S_3$ with different potentials to control the rotation rate of the motor 3.

FIG. 8 is a timing chart showing timings in the motor control device 2 according to the preferred embodiment of the present invention. As shown in FIG. 8, the first phase-wave signal $W_1$ and the second phase-wave signal $W_2$ are phase-wave signals having the same amplitude but opposite phases. The first control signal $S_1$ and the second control signal $S_2$ have the waveforms respectively generated by modulating the first phase-wave signal $W_1$ through the first waveform modulating module 22, and modulating the second phase-wave signal $W_2$ through the second waveform modulating module 23. The rotation rate control signal $S_3$ has the waveform generated by the control signal integrating module 25 in accordance with the first control signal $S_1$ and the second control signal $S_2$.

Figure 1:
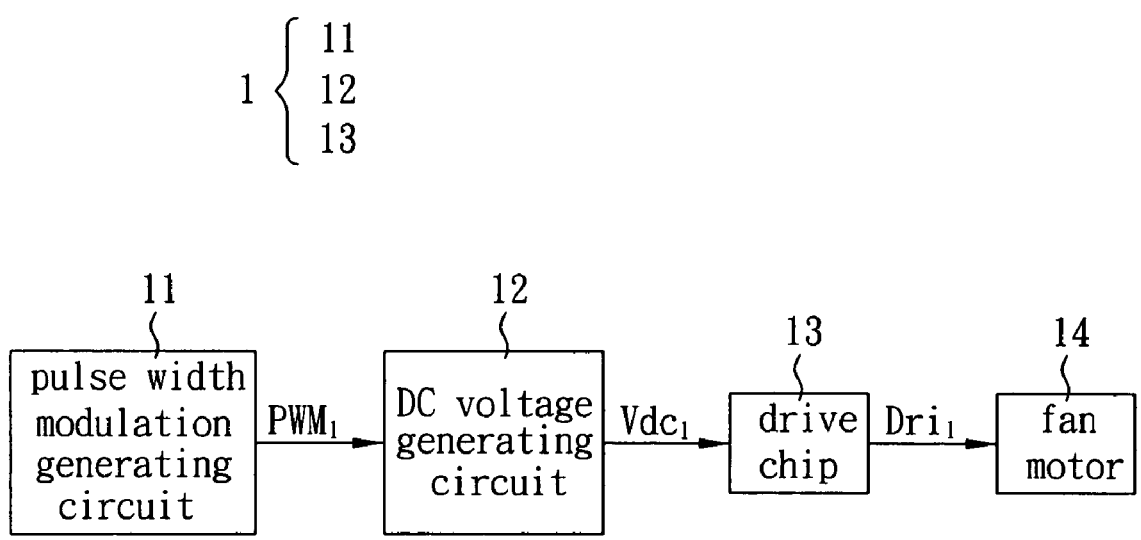
FIG. 1 is a block diagram showing a conventional motor control device.
Figure 2:
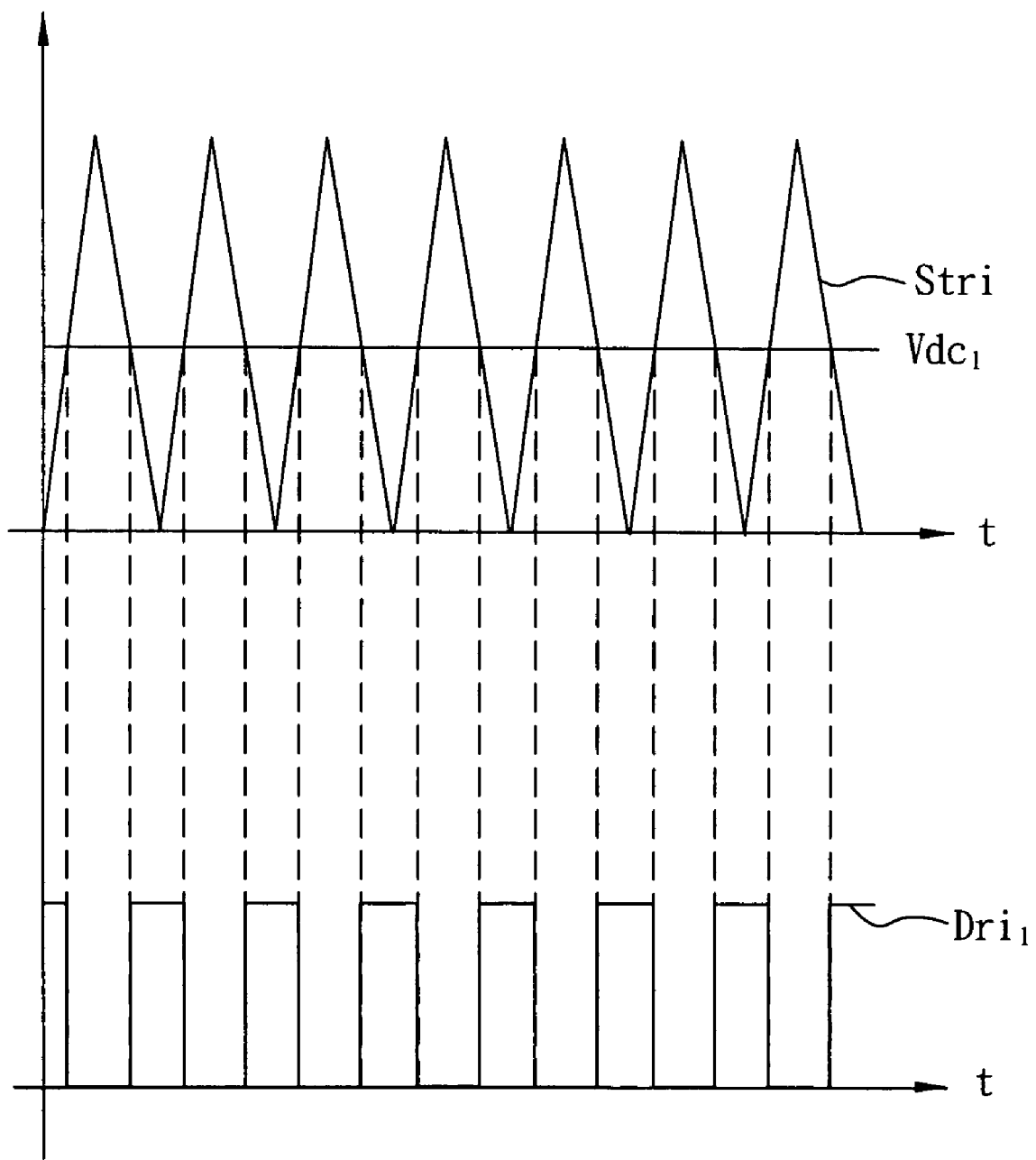
FIG. 2 is a waveform diagram showing a conventional drive signal inputted to a motor.
Figure 3:
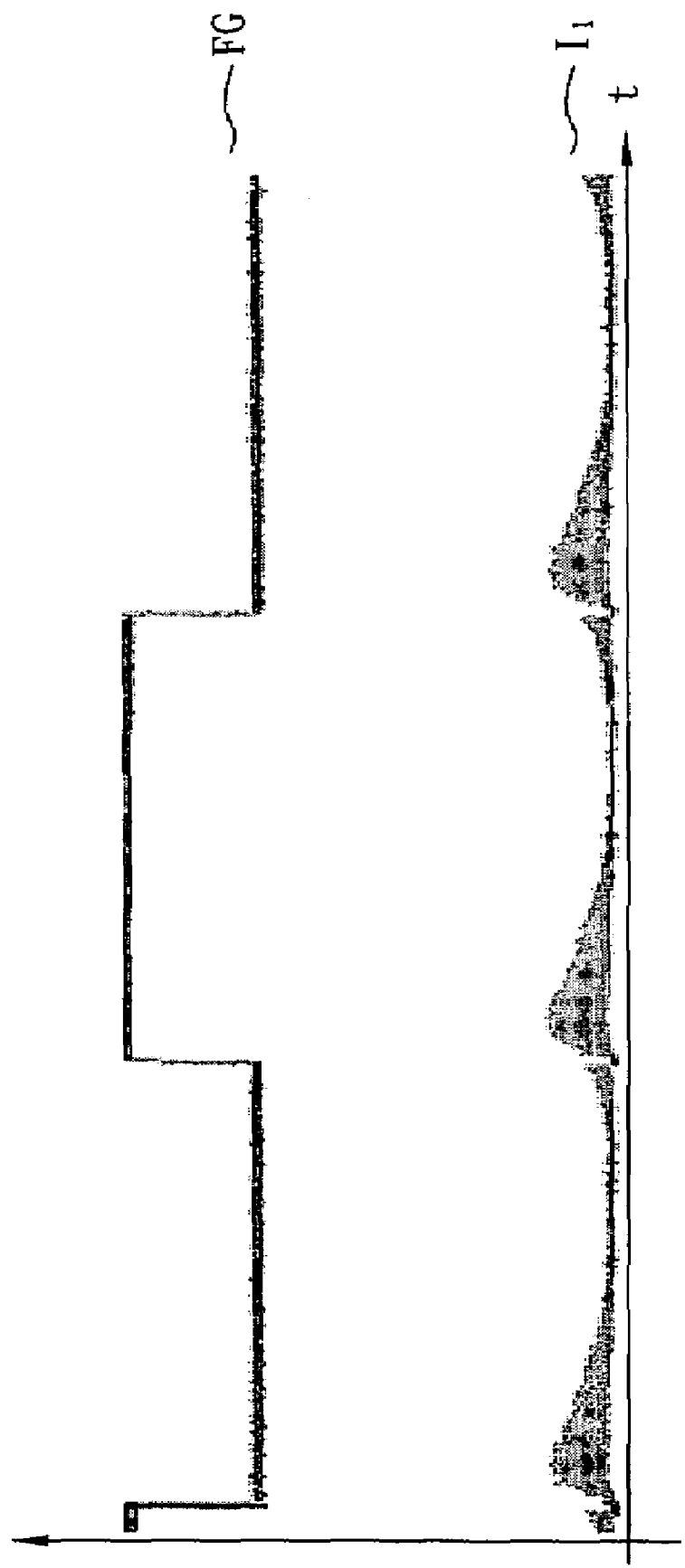
FIG. 3 is a schematic diagram showing the current waveform detected from the power terminal of the conventional motor control device under a low rotation rate.
Figure 4:
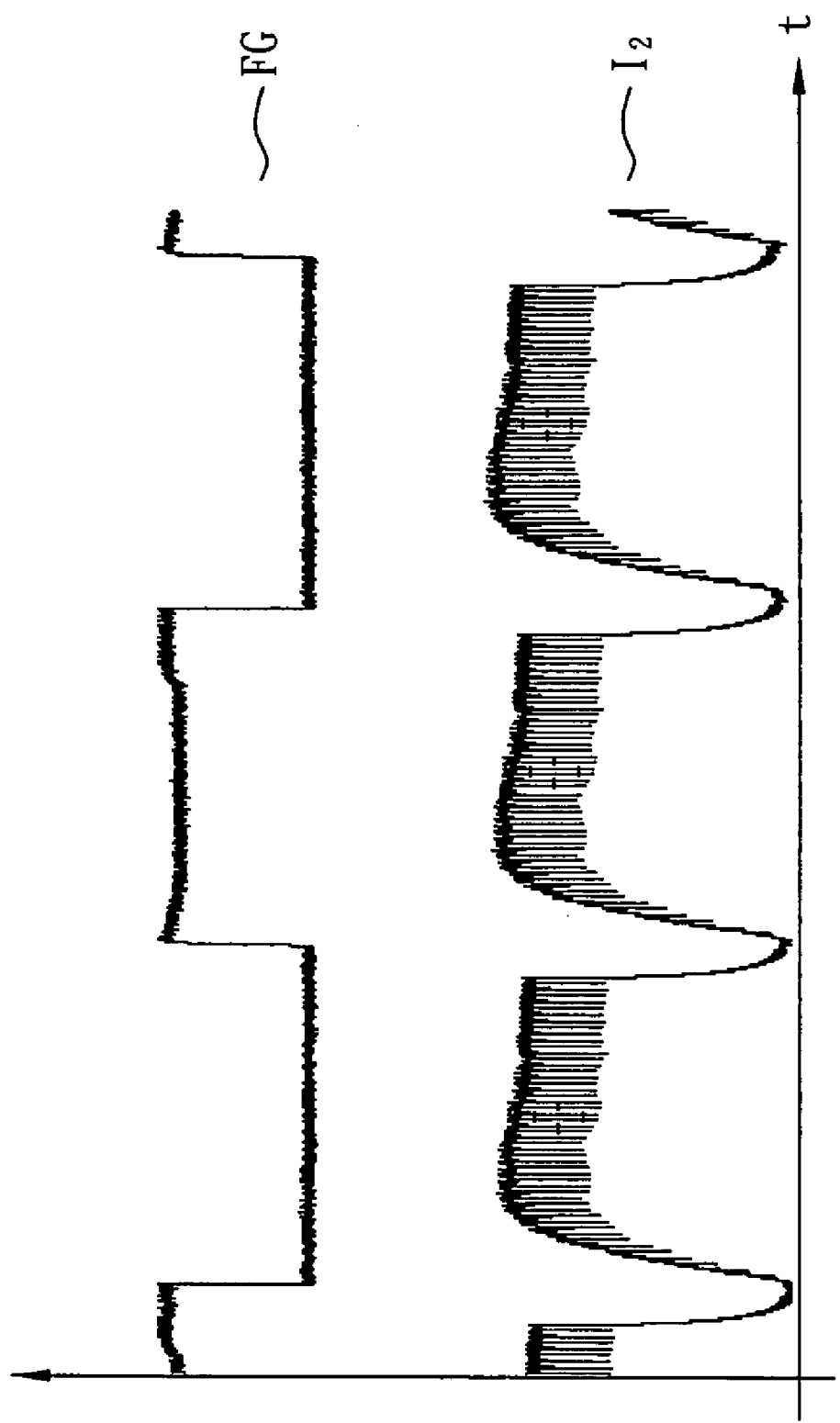
FIG. 4 is a schematic diagram showing the current waveform detected from the power terminal of the conventional motor control device under a high rotation rate.
Figure 9:
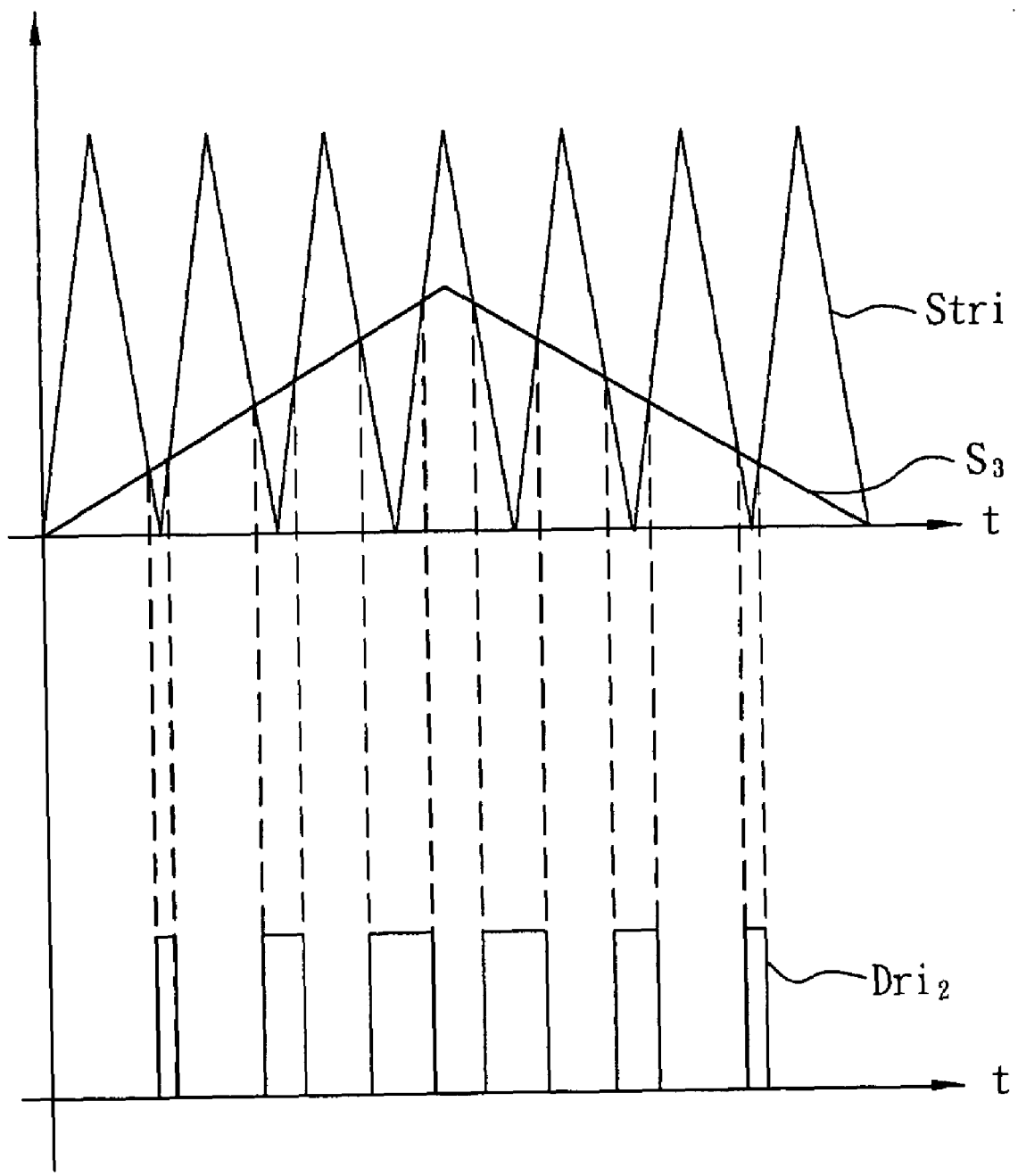
FIG. 9 is a waveform diagram showing the drive signal inputted to a motor according to the preferred embodiment of the present invention.
Figure 10:
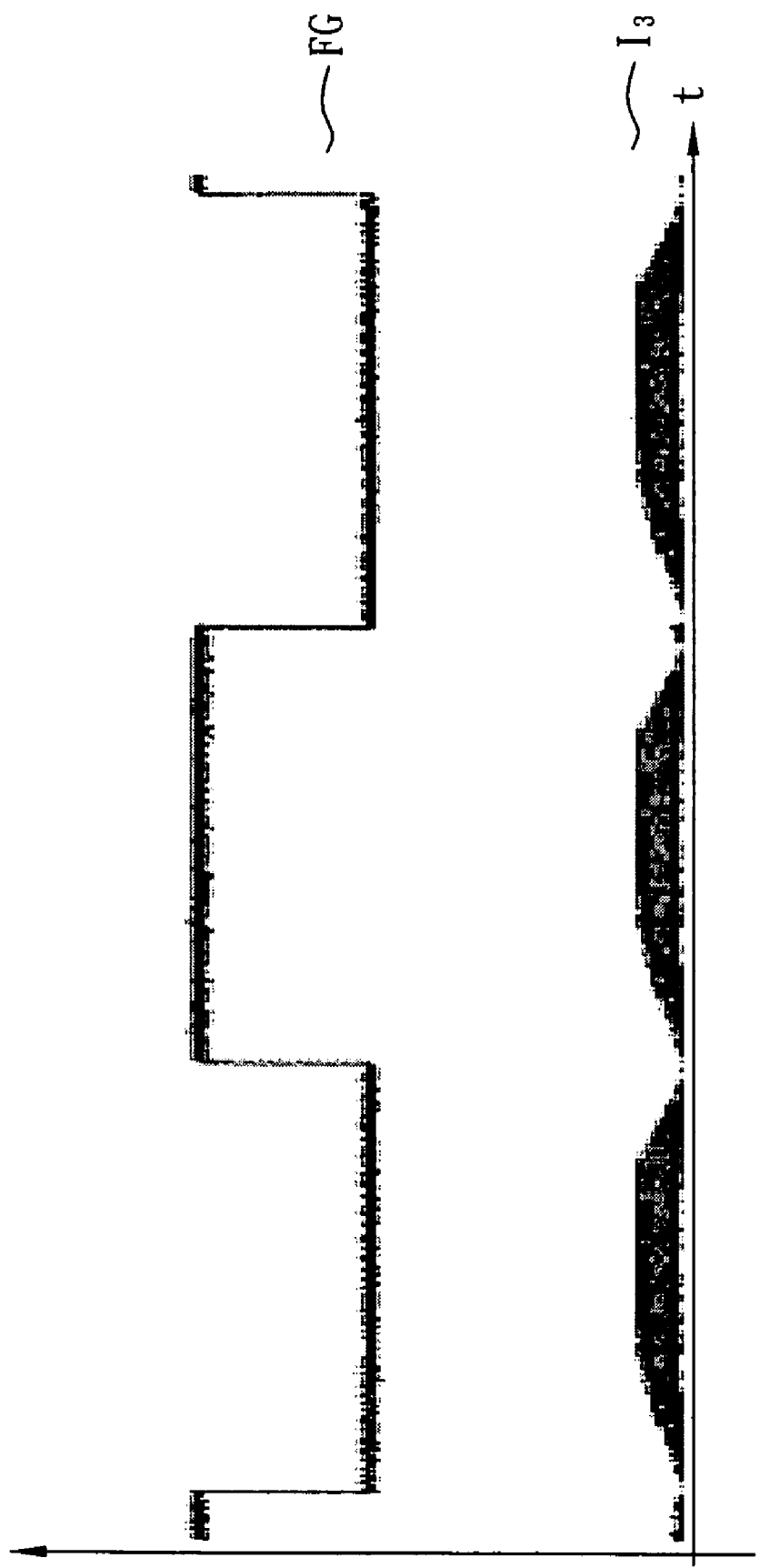
FIG. 10 is a schematic diagram showing the current waveform detected from the power terminal of the motor control device under a low rotation rate according to the preferred embodiment of the present invention.

As shown in FIG. 9, when the rotation rate control signal $S_3$ is inputted into the drive module 26, the rotation rate control signal $S_3$ is compared with a high-frequency triangular-wave signal $Stri$ in the drive module 26 for generating the drive signal $Dri_2$. Comparing FIG. 9 with FIG. 2, it is obvious that the duty cycle of the drive signal $Dri_2$ of the present invention is not constant (increasing and then decreasing). A current waveform $I_3$ detected from the power terminal of the motor control device 2 is shown in FIG. 10 when the motor 3 is controlled under a low rotation rate. A current waveform $I_4$ detected from the power terminal of the motor control device 2 is shown in FIG. 11 when the motor 3 is controlled under a high rotation rate.

As shown in FIG. 10, the current value of the current waveform $I_3$ is lowered when the phase of the rotation-rate waveform FG outputted from the motor 3 is changed (the rotation-rate waveform FG can be the first phase-wave signal $W_1$ or the second phase-wave signal $W_2$). Therefore, pulling up current between the phases changed can generate the required rotating torque, the noises will not occur as the prior art.

Figure 11:
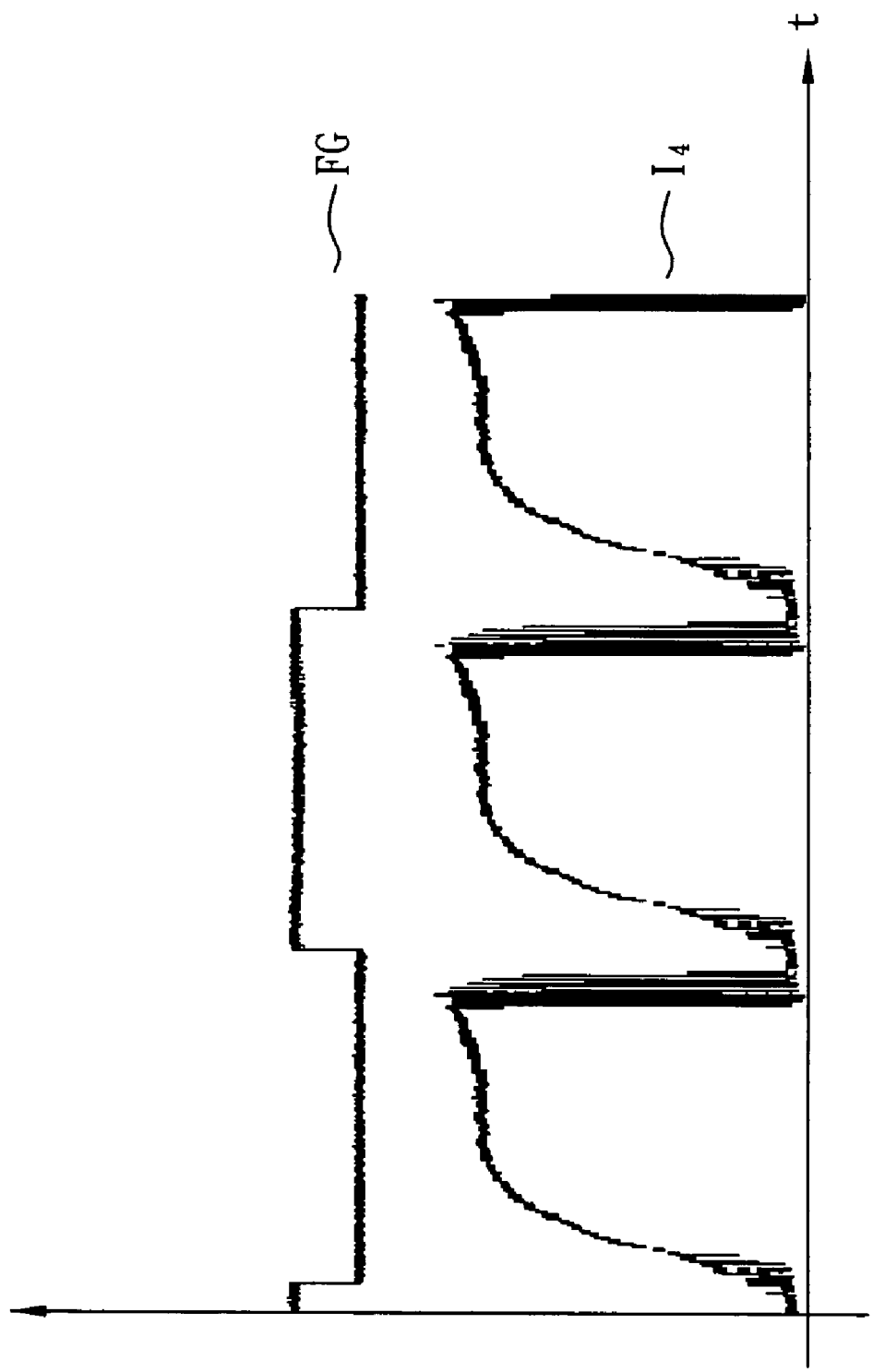
FIG. 11 is a schematic diagram showing the current waveform detected from the power terminal of the motor control device under a high rotation rate according to the preferred embodiment of the present invention.

As shown in FIG. 11, because the duty cycle of the current waveform $I_4$ is lowered and the phase of the rotation-rate waveform FG outputted from the motor 3 is changed, the noises will not occur distinctly.

In summary, the motor control device 2 according to the present invention utilizes the first waveform modulating module 22 and the second waveform modulating module 23 to modulate the first phase-wave signal $W_1$ and the second phase-wave signal $W_2$, which are square waves, into the first control signal $S_1$ and the second control signal $S_2$, which are triangular wave outputs. Then, the control signal integrating module 25 integrates the first control signal $S_1$ with the second control signal $S_2$ to generate the rotation rate control signal $S_3$, which is compared with the high-frequency triangular-wave signal Stri in the drive module 26 for generating the drive signal $Dri_2$ output to the motor 3. When the phases of the first phase-wave signal $W_1$ and the second phase-wave signal $W_2$ are changed, the duty cycle of the drive signal $Dri_2$ is decreased such that the energy of the drive module 26 for controlling the motor 3 to start is also lowered, and the noise caused by the rotation of the motor can be reduced.

Another aspect of the motor control device according to the preferred embodiment of the invention will be described in the following.

Referring again to FIG. 5, a motor control device 2 according to the invention includes a phase-wave signal sampling module 21, a waveform modulating module and a drive module 26.

The phase-wave signal sampling module 21 outputs a first phase-wave signal $W_1$ and a second phase-wave signal $W_2$ according to rotation of a motor 3.

The waveform modulating module generates a rotation rate control signal $S_3$ according to the first phase-wave signal $W_1$ and the second phase-wave signal $W_2$. In this embodiment, the waveform modulating module integrates the first waveform modulating module 22, the second waveform modulating module 23 and the control signal integrating module 25 in the above-mentioned embodiment, which has the same operations and functions as those mentioned in the above-mentioned embodiment. Detailed description thereof is omitted.

The drive module 26 receives the rotation rate control signal $S_3$ and generates a drive signal $Dri_2$ to drive the motor 3.

In summary, the motor control device according to the invention utilizes the waveform modulating module to generate the drive signal $Dri_2$, the duty cycle of which is lowered when the phases of the first phase-wave signal $W_1$ and the second phase-wave signal $W_2$ are changed. Thus, a suitable rotation rate control signal can be provided to the drive module, and the outputted noise as the motor 3 rotates can be reduced.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor control device for controlling a motor to rotate, comprising:
    a phase-wave signal sampling module outputting a first phase-wave signal and a second phase-wave signal in accordance with the rotation of the motor;
    a first waveform modulating module generating a first control signal in accordance with the first phase-wave signal;
    a second waveform modulating module generating a second control signal in accordance with the second phase-wave signal;
    a control signal integrating module generating a rotation rate control signal in accordance with the first control signal and the second control signal; and
    a drive module generating a drive signal in accordance with the rotation rate control signal for controlling a rotation rate of the motor.

2. The motor control device according to claim 1, wherein the first phase-wave signal and the second phase-wave signal have the same amplitude but opposite phases.

3. The motor control device according to claim 1, wherein the first waveform modulating module or the second waveform modulating module comprises an integrated circuit, or comprises an OP amplifier, at least one resistor and a capacitor, or comprises a switch element, a resistor and a capacitor.

4. The motor control device according to claim 3, wherein the switch element is a field effect transistor.

5. The motor control device according to claim 1, wherein the first waveform modulating module or the second waveform modulating module modulates a square wave input into a triangular wave output.

6. The motor control device according to claim 1, further comprising a power generating module receiving a pulse width modulation signal, generating a DC power signal, and inputting the DC power signal to the first waveform modulating module and the second waveform modulating module, respectively.

7. The motor control device according to claim 6, wherein the DC power signal defines a maximum of the first control signal and the second control signal.

8. The motor control device according to claim 1, wherein the drive module comprises a Hall element generating the square wave signal in accordance with the rotation of the motor, and outputting the first phase-wave signal and the second phase-wave signal through the phase-wave signal sampling module.

9. The motor control device according to claim 1, wherein the phase-wave signal sampling module comprises two resistors.

10. The motor control device according to claim 1, wherein the control signal integrating module comprises at least two diodes.

11. The motor control device according to claim 1, wherein the rotation rate control signal is compared with a high-frequency signal in the drive module for outputting the drive signal when the duty cycle is not constant.

12. The motor control device according to claim 11, wherein the duty cycle of the drive signal is lowered when the phases of the first phase-wave signal and the second phase-wave signal are changed.

13. The motor control device according to claim 1, wherein the drive module is a digital signal processor or a microprocessor control unit.

14. A motor control device, comprising:
- a phase-wave signal sampling module outputting a first phase-wave signal and a second phase-wave signal in accordance with the rotation of a motor;
- a waveform modulating module generating a rotation rate control signal in accordance with the first phase-wave signal and the second phase-wave signal; and
- a drive module receiving the rotation rate control signal and generating a drive signal to drive the motor, and the duty cycle of the drive signal is lowered when the phases of the first phase-wave signal and the second phase-wave signal are changed.

15. The motor control device according to claim 14, wherein the first phase-wave signal and the second phase-wave signal have the same amplitude but opposite phases.

16. The motor control device according to claim 14, wherein the waveform modulating module comprises an integrated circuit, or comprises an OP amplifier, at least one resistor and a capacitor, or comprises a switch element, a resistor and a capacitor.

17. The motor control device according to claim 16, wherein the switch element is a field effect transistor.

18. The motor control device according to claim 14, wherein the waveform modulating module comprises a first waveform modulating module, a second waveform modulating module and a control signal integrating module, the first waveform modulating module generates a first control signal in accordance with the first phase-wave signal, the second waveform modulating module generates a second control signal in accordance with the second phase-wave signal, and the control signal integrating module generates the rotation rate control signal in accordance with the first control signal and the second control signal.

19. The motor control device according to claim 14, wherein the waveform modulating module modulates a square wave input into a triangular wave output.

20. The motor control device according to claim 14, wherein the drive module comprises a Hall element generating the square wave signal in accordance with the rotation of the motor, and outputting the first phase-wave signal and the second phase-wave signal through the phase-wave signal sampling module.

21. The motor control device according to claim 14, wherein the phase-wave signal sampling module comprises two resistors.

22. The motor control device according to claim 14, wherein the drive module is a digital signal processor or a microprocessor control unit.

* * * * *